United States Patent
Prieston

(10) Patent No.: US 7,707,103 B2
(45) Date of Patent: Apr. 27, 2010

(54) SYSTEM AND METHOD FOR RATING LENDERS

(76) Inventor: Arthur J Prieston, 65 Mitchell Blvd., First Floor, San Rafael, CA (US) 94903

(*) Notice: Subject to any disclaimer, the term of this patent is extended or adjusted under 35 U.S.C. 154(b) by 1124 days.

(21) Appl. No.: 11/079,927

(22) Filed: Mar. 15, 2005

(65) Prior Publication Data

US 2005/0203834 A1 Sep. 15, 2005

Related U.S. Application Data

(60) Provisional application No. 60/600,832, filed on Aug. 12, 2004, provisional application No. 60/552,712, filed on Mar. 15, 2004.

(51) Int. Cl.
G06Q 40/00 (2006.01)
(52) U.S. Cl. .......................... 705/38; 705/39
(58) Field of Classification Search .................. 705/38, 705/35, 39
See application file for complete search history.

(56) References Cited

U.S. PATENT DOCUMENTS

| | | | |
|---|---|---|---|
| 4,876,648 A * | 10/1989 | Lloyd | 705/38 |
| 6,029,149 A | 2/2000 | Dykstra et al. | |
| 6,119,103 A | 9/2000 | Basch et al. | |
| 6,186,793 B1 | 2/2001 | Brubaker | |
| 6,233,566 B1 * | 5/2001 | Levine et al. | 705/36 R |
| 6,898,574 B1 * | 5/2005 | Regan | 705/38 |
| 7,146,337 B1 * | 12/2006 | Ward et al. | 705/38 |
| 7,499,882 B2 | 3/2009 | Cole | |
| 2001/0029482 A1 * | 10/2001 | Tealdi et al. | 705/38 |
| 2002/0103750 A1 | 8/2002 | Herzfeld | |
| 2002/0133371 A1 | 9/2002 | Cole | |
| 2003/0050884 A1 * | 3/2003 | Barnett | 705/35 |
| 2003/0093365 A1 | 5/2003 | Halper et al. | |
| 2003/0093366 A1 | 5/2003 | Halper et al. | |
| 2003/0115125 A1 | 6/2003 | Lee et al. | |
| 2003/0120588 A1 | 6/2003 | Dodd et al. | |
| 2004/0019508 A1 | 1/2004 | Yaruss et al. | |
| 2004/0019544 A1 | 1/2004 | Yaruss et al. | |
| 2004/0030616 A1 * | 2/2004 | Florance et al. | 705/27 |
| 2004/0098329 A1 * | 5/2004 | Tilton | 705/36 |
| 2004/0215553 A1 * | 10/2004 | Gang et al. | 705/38 |
| 2005/0010517 A1 * | 1/2005 | Lowenstein et al. | 705/37 |
| 2005/0108025 A1 | 5/2005 | Cagan | |
| 2005/0203779 A1 | 9/2005 | Prieston | |

(Continued)

OTHER PUBLICATIONS

ForRelease.com, "PBIS Insurance Services Enters Agreement with Greenpoint Mortgage To Provide Fraud Insurance to Correspondents," printed on Nov. 8, 2004.

(Continued)

*Primary Examiner*—James P Trammell
*Assistant Examiner*—John A C Anderson
(74) *Attorney, Agent, or Firm*—Cahn & Samuels LLP

(57) ABSTRACT

The present invention is directed at a system and method to rate lender profiles to determine the level of risk that is present in the loans originated or purchased by a particular lender will have a misrepresentation or as a result of material inaccuracies in the financial information provided by or on behalf of the borrower. The rating is preferably based on a variety of factors including at least one of, for example, prefunding controls, post closing controls, product mix, and/or loan source.

22 Claims, 2 Drawing Sheets

U.S. PATENT DOCUMENTS

| | | |
|---|---|---|
| 2005/0203830 A1 | 9/2005 | Prieston |
| 2005/0203831 A1 | 9/2005 | Prieston |
| 2005/0203832 A1 | 9/2005 | Prieston |
| 2006/0136330 A1 | 6/2006 | DeRoy et al. |
| 2006/0178918 A1* | 8/2006 | Mikurak .................. 705/7 |

OTHER PUBLICATIONS

Prieston, Arthur J., "Mortgage Fraud and Its Impact on Mortgage Lenders," Oct. 7, 2004.

Safeco Financial Institution Solutions, "Mortgage Representations and Warranties Coverage," SM 61 44/EF, May 2002.

Sysdome, redacted Affinity Electronic Review Alert Report, Dec. 29, 2004.

Sysdome, Inc., "The Sysdome Advantage," 2004.

Sysdome, Inc., "Sysdome Broker Score," ,www.sysdome.com/content/brokers/index.asp, printed on Oct. 20, 2004.

Sysdome, Inc., "TPO Certification Program at a Glance," Loan Quality and Fraud Prevention Services, www.sysdome.com/content/brokers/tpocert.asp, printed on Oct. 20, 2004.

* cited by examiner

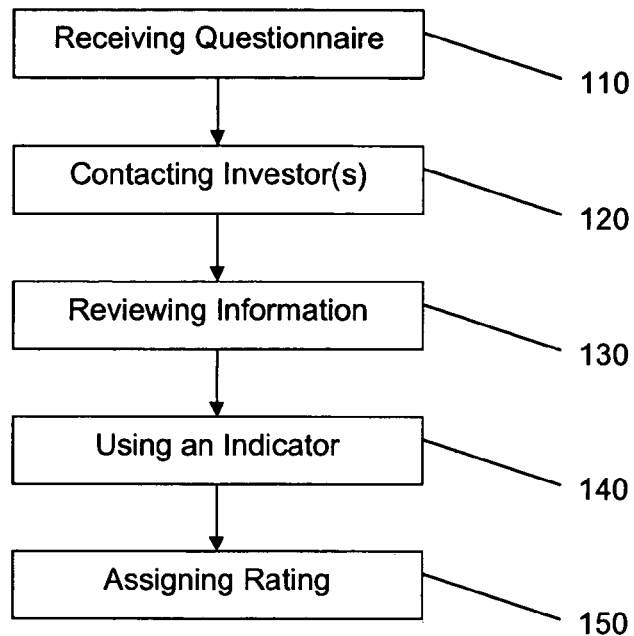
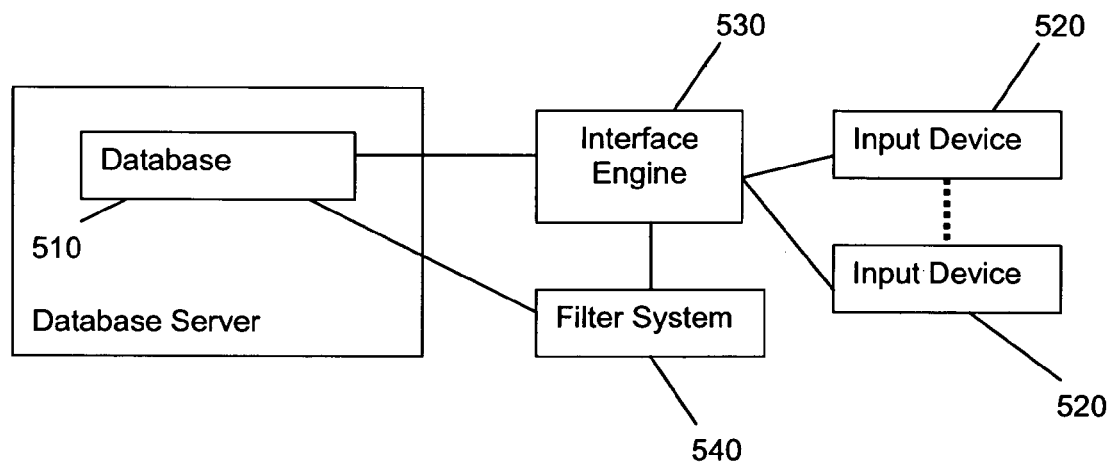

SYSTEM AND METHOD FOR RATING LENDERS

This patent application claims the benefit of U.S. Provisional Patent Application No. 60/600,832, filed Aug. 12, 2004, and U.S. Provisional Patent Application No. 60/552,712, filed Mar. 15, 2004. Both of these provisional patent applications are hereby incorporated by reference.

I. FIELD OF THE INVENTION

This invention relates to a method and system for predicting the risk that a particular lender will sell a loan to an investor in which a repurchase request will be made thus resulting possibly in an insurance claim under a representation and warranty insurance for loans. More particularly, the field of the invention is for use in the mortgage industry.

II. BACKGROUND OF THE INVENTION

Currently, there are no known methods for assessing the risk in buying and/or purchasing a loan from a particular loan source.

There are systems out there for analyzing the risk with a particular loan such as U.S. Patent Application No. 2003/0093366 listing Halper et al. An inherent problem with Halper and similar systems is the reliance on public data, which may be too old to have use, or the age of the data is unknown, and the accuracy and integrity of the data can be questionable. The Halper system is a fraud filter for use to detect whether a particular loan is fraudulent as opposed to whether a lender has a particular profile that would indicate that it would originate or purchase loans, which were obtained through a misrepresentation.

Factors that one of ordinary skill in the art would believe to impact such an analysis provide little insight into the risk analysis at best, and most times may provide an inaccurate picture of the risk. Some of this is caused by misidentification and/or misclassification of information that is reported or available including the reason for repurchase.

Notwithstanding the usefulness of the above-described methods, a need still exists for a system and a method for rating a lender based at least upon the strength of a lender's controls and corresponding history of loan repurchases, as well as upon the lender profile and loan programs for that lender.

III. SUMMARY OF THE INVENTION

This invention provides a novel way to analyze data that has not been used in the past to assess whether a particular lender is more likely than other lenders to originate or purchase loans with misrepresentation issues based at least in part on the risk of the lender profile and other considerations.

An objective of at least one embodiment of the invention is to provide a system and a method for rating lenders based on verifiable numbers and information to insure an accurate rating of the respective lenders.

An objective of at least one embodiment of the invention is to increase the predictability and accuracy in determining what a correct insurance premium is for loans originated or purchased by a particular lender.

An objective of at least one embodiment of the invention is to provide a rating that can be used by an investor to compare different lenders with respect to the risk involved with purchasing a loan from them.

An advantage of at least one embodiment of the invention is to provide a comparison between lenders as to the risk of a typical loan originated or purchased by them.

An advantage of at least one embodiment of the invention is a straight forward methodology to rating lenders.

An advantage of at least one embodiment of the invention is to provide a factor to use in determining the insurance risk of providing coverage for repurchase of a loan by the lender.

Given the following enabling description of the drawings, the system should become evident to a person of ordinary skill in the art.

IV. BRIEF DESCRIPTION OF THE DRAWINGS

FIG. 2 depicts a method according to at least one embodiment of the present invention.

FIG. 3 illustrates a block diagram according to at least one embodiment of the present invention.

V. DETAILED DESCRIPTION OF THE DRAWINGS

Figure 1:
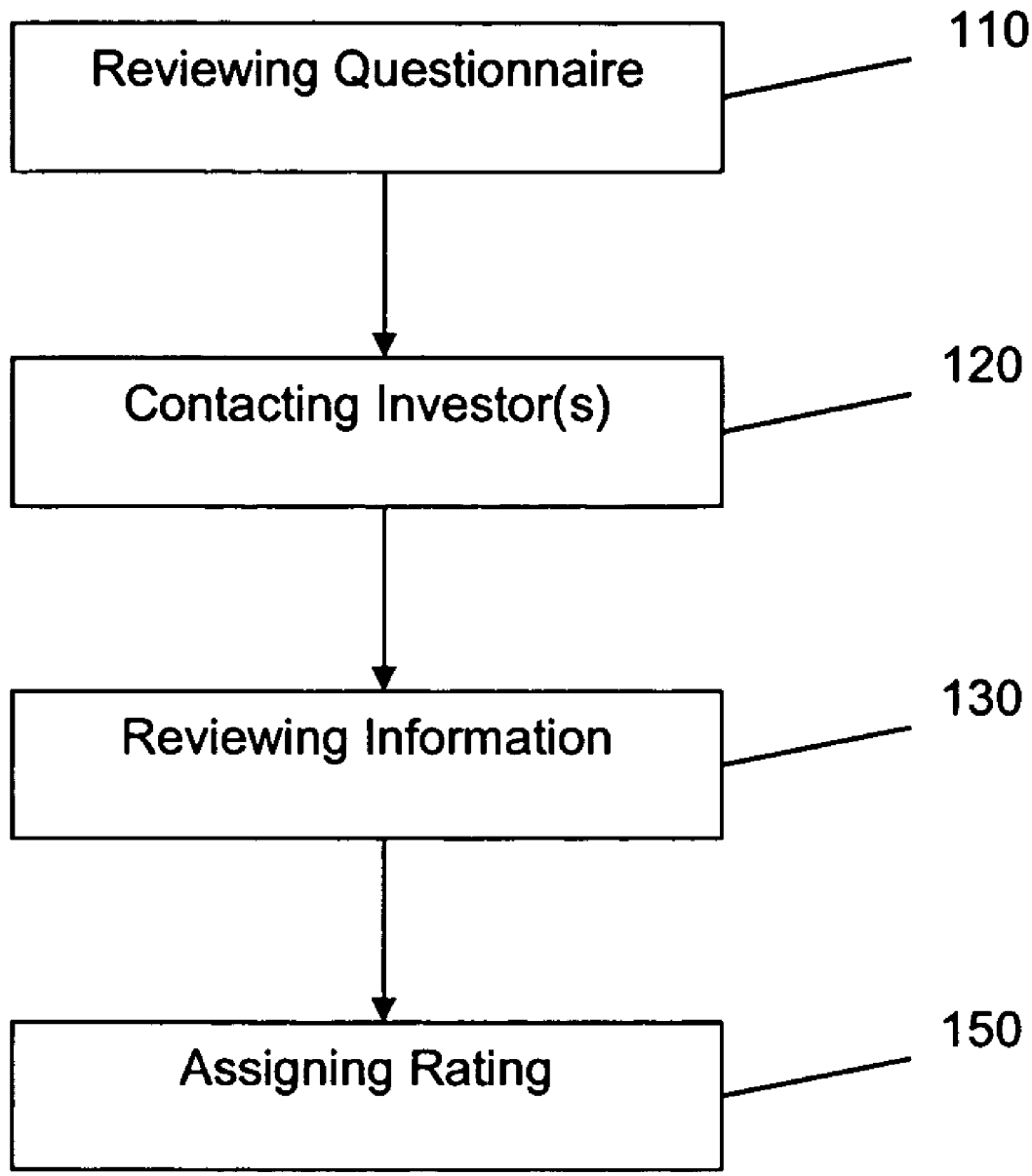
FIG. 1 illustrates a method according to at least one embodiment of the present invention.

The present invention preferably is a system and a method for assessing the risk of doing business with a lender (an entity that participates in the loan process and/or sells acquired loans to investors), thereby giving the insurer and investors access to more detailed information and insight regarding, for example, the lender's prefunding operating controls and repurchase history than is currently being gathered during the lender approval process and provides the necessary information whereby ratings can be assigned to lenders. Lender ratings preferably take into account, for example, the level of internal controls, and the likelihood of originating or purchasing loans that are based upon a misrepresentation or as a result of material inaccuracies in the financial information provided by or on behalf of the borrower. The lender ratings serve as a basis to compare lenders to their peers for comparison purposes to assist, for example, investors in making purchasing decisions or an insurer for setting pricing for warranty and representation insurance. A variety of factors are preferably utilized in the analysis that leads to the lender ratings as will be more fully developed below.

An exemplary embodiment of the invention includes a method for performing the due diligence of a lender that leads to a rating for that lender. The method as illustrated in FIG. 1 includes reviewing a completed questionnaire (or application) 110, contacting previous and/or current investors (or loan buyers) 120, and reviewing internal information and documentation from the lender 130. After the review and evaluation is complete, a rating is assigned based on analysis of the reviewed information 150, which in the exemplary embodiment is a numerical rating of 1-5 but could be any rating style that allows for comparison between two or more lenders. The rating allows the lenders, investors, and insurers to compare different lenders against each other or, in a further embodiment, particular offices of the same lender depending on, for example, the structure of the particular lender. Preferably, the questionnaire covers areas and information that is useful for setting the rating for the lender as will be more fully developed herein. This information may also have use for setting an insurance premium and providing general background information as will be more fully developed herein.

There are a variety of factors that indicate that a lender is riskier than other lenders, and as a result should have a lower rating unless there are controls in place to offset the risk. The level of controls employed by a lender need to reflect the risk presented by the lender's business model. A higher number of repurchase requests can result because of riskier loans and/or lax controls (or failure to implement and use both the prefunding and/or post closing controls properly). The prefunding controls are more important for the wholesale market where the loan is originated or purchased through a broker or a correspondent.

For example, if the rating was on a numerical scale of 1-5, then the following are examples of what considerations would place the lender into each of the rating levels similar to a bell curve. Some simplified examples of how the rating scale is applied according to the invention are offered herein.

The first example is a lender that obtains 80% of its loans through the wholesale market. The controls used by the lender are deficient in comparison to peers in the lender's industry (or any developed standard of care in the lender's industry). The loans that are handled by the lender have a high percentage of repurchase requests as compared to other lenders including a number of pending repurchase requests. The lender also has been suspended by multiple parties for originating and purchasing loans with misrepresentations. Based on these facts, there is a large risk that future loans handled by this lender will have misrepresentations and therefore the rating for the lender is a 5.

A second example is a lender that originates and closes 40% of its own loans, with the balance coming through wholesale channels, accepts loans with loan to values (LTVs) between 80% and 90%, has acceptable controls, and has repurchase requests for misrepresentation or credit slightly higher than its peers. The rating for the lender is likely to be a 3 or 4 assuming the rest of the due diligence uncovers no information out of the ordinary.

A third example is a lender that originates and closes its own loans, requires on most loans a LTV of 80% or less. The lender has relatively few repurchase requests for misrepresentation or credit as compared to industry averages, but the lender has lax use of the controls that are similar to most of its peers. The lax use of the controls in this situation will impact the rating less than if the loans were largely acquired through the wholesale market where prefunding controls are critical. The rating for the lender is likely a 3 depending upon the rest of the due diligence. However, as the percentage of the loans obtained via the wholesale market increases, the rating will be similarly and negatively impacted.

A fourth example is a lender that originates and closes its own loans, requires on most loans a LTV of 80% or less, has no repurchase requests for misrepresentation or credit and has strong controls compared to other lenders. The rating for the lender is likely a 1 assuming the rest of the due diligence uncovers no information out of the ordinary.

An exemplary alternative to a rating is a risk assessment. The risk assessment is based on how the lender compares to other lenders in terms of controls, loan products, loan markets, and geographic markets that the lender is present. The risk assessment in at least one exemplary embodiment is based on the quality of the origination process and the internal controls and procedures used by the lender.

Additional exemplary embodiments add the use of an indicator 140 as illustrated in FIG. 2. Depending upon which of the indicator exemplary embodiments, the presence of the indicator causes at least one of the following to occur: an additional level of review will be performed of the lender, a more thorough investigation and review of information from interviews of the lender and investors to reviewing loan files of the lender, and/or drawing a negative inference and lowering the lender's rating because of the indicator. The indicator is based on a variety of factors taken from the application and initial investigation. The factors preferably include the number of repurchase requests, the source of the loans handled by the lender, the level and completeness of the controls of the lender, and the types of loan products that are handled by the lender. These factors are listed in the preferred order of importance of determining whether the further investigation is required. Although the controls and product types can be reversed depending upon the riskiness of the loan products being offered by the lender. The loan source includes correspondent (originated and closed by another entity), broker (originated by another entity and closed by the lender) and retail (originated and closed by the lender). The higher percentage of loans not handled in-house by the lender increases the risk that loans from correspondents and/or brokers are not as fully subject to the controls of the lender because they are processed at least in part by entities other than the lender.

The additional review of the lender can include requesting additional information from the lender to determine the source of the indicator and whether the rating should be impacted as a result. Additional information can include more specific and detailed production and historical information.

The more thorough investigation is an extension of the additional review and may include reviewing a sampling of actual loan files, interviewing more personnel at the lender, interviewing more investors, and/or conducting more detailed interviews with investors. The review of loan file sampling is performed to see, for example, if internal procedures are being followed, there is adequate documentation, and/or deviation from the lender business model or operating procedures. The purpose of this review is to see how well both the prefunding and post closing controls are utilized in handling loans because this will provide an indication as to how much additional risk might exist as result of the number of repurchase requests intertwined with the product type and controls.

The negative inference is that if an indicator is present, then the lender's rating will be lower than it would otherwise be. This can include a lowering of the rating by a predetermined amount such as one level or used as an additional factor in the analysis that assigns the rating to the lender.

Another exemplary embodiment adds an update procedure that can occur as a change in circumstances occurs. Since there are always changes occurring, it is preferable to have the rating for lenders not be a static rating and to instead take into account these changes to provide a more accurate representation of the risk involved with a particular lender profile. A change in circumstances includes, for example: claims made if that information is provided to the ratings entity, changes in the lender profile based on loan information submitted by the lender at predetermined times such as weekly or monthly, marketplace changes that will impact the likelihood of repurchase requests and/or claims in the future, information derived from repurchase requests made to other lenders, and trends.

The claims made can further include the number of claims, the types of claims in terms of the reason for the claims, and the concentration of the claims. The concentration of claims provides an indication if there is, for example, a particular geographic area, and/or a loan product type such as original purchase as compared to refinance and/or home equity have become more risky. The claim concentration preferably is compared to the profile for that particular lender and can also be used to adjust the ratings of other lenders if they have lender profiles that would be impacted by a particular claim concentration.

The change in the lender profile is based on the review that occurs of the monthly production information that is provided by the lender. If the lender profile has divergences between the current profile and profile at the time of the last questionnaire and/or due diligence investigation. For example, if the lender had mainly retail loans, but now has mostly wholesale loans, then their rating will be negatively impacted. Another example is if the lender reduced the loan volume in geographic areas where there was a higher risk of misrepresentation, then their rating will be positively impacted if the shift in loan volume continues.

In at least one exemplary embodiment, as information is learned about the marketplace regarding fraud and misrepresentation, this information is used to adjust ratings of lenders whose profile overlaps the marketplace factors in question. An example is if a city (or a geographic region) is undergoing a higher incidence of fraud and/or misrepresentation, then lenders who originate or purchase a significant number and/or percentage of loans (particularly in comparison to the overall volume of loans for that lender) from that city will have their ratings impacted by this information because there will be a higher likelihood that repurchase requests will be made for loans for property in that city even though no requests may have been made yet.

In at least one exemplary embodiment, when similarities exist between repurchase requests made at one lender with the profile of other lenders, the ratings for those lenders will be impacted to the extent that the similarity was the reason for the repurchase request. For example, if a particular settlement agent has a large property flip closing business, then lenders who work with that settlement agent will be negatively impacted as a result. Conversely, if a lender has included the settlement agent on their ineligible list, then their rating will not be impacted by this information. Another example of an overlay is one for fraud incidence, which preferably is updated based upon industry reports, repurchase requests, and claims made and/or paid by the insurer.

In at least one exemplary embodiment, as trends are noticed by the rating entity, this information is then compared to lender profiles to determine if there is overlap between the characteristic that is changing according to the trend. If repurchase requests are increasing for a particular loan product for consumers that have a credit score within a particular credit score range, then lenders whose profiles overlap with this information would have their ratings adjusted accordingly.

In at least one exemplary embodiment, other sources or reasons for adjusting a rating of a lender include claims paid by an insurer, changes in geographic dispersion of the lenders production, changes in the lender's operating controls, for example, learned during a claim investigation, investor references or other reports learned by the rating entity, and the portfolio containing potentially claimable loans.

Another exemplary embodiment incorporates reviews at predetermined times, for example, an annual review. This type of review provides for the information gathered during the initial due diligence process to be updated annually with each lender and verifications again performed with investors. Upon return of renewal due diligence information, changes to the lender's profile are entered in the database with the effective date of such changes retained electronically. The lender rating is then adjusted accordingly.

The lender ratings that result after the due diligence in the exemplary embodiment combined with claims experience under the insurer's insurance program, lenders are assigned a rating. This rating reflects a particular lender's performance in relation to its peers, claims history, and non-claim (or non-reported) repurchases. Ratings in a further exemplary embodiment are made available to the insurance carrier, its insured(s), and/or other information subscribers. The level and frequency of access by these entities to the database preferably is limited or alternatively subject to a fee schedule or other service levels that might exist. The exemplary embodiment may provide the database through a website or other automated mechanism that is capable of search and retrieval of information. Preferably, the lender ratings are not static but are adjusted as changes occur, for example, in the lender profile, industry dynamics, and/or trends.

Another exemplary embodiment allows information subscribers to have access to information that was used to produce the rating for a particular lender. This information can include statistics from the lender profile. The reason for this is to allow investors that buy loans in particular niches to locate potential lenders whose lender's profile provides a match.

The questionnaire (or the application) in the exemplary embodiment preferably solicits information relating to, for example, corporate structure, policies and procedures such as those for quality control, quality control structure, historical information, production, training, and/or secondary marketing. Preferably for each of these types of information, the questionnaire solicits more detail information. A portion of the requested information is used for general background information, a source for further investigation and due diligence study, information to base the lender rating on, and/or information for setting the premium to be charged the lender by an insurer. Some of the requested information may be used for multiple purposes. As will be appreciated by those of ordinary skill in the art after reviewing this disclosure, the questionnaire may take a variety of forms other than that described.

For example, the corporate structure information may include identification of the President and CEO, number of company employees, how long the company has been in business, how was the company capitalized such as operating subsidiary of a bank or funded by private investors, what is the amount of the company's warehouse line, and who the warehouse line is with. Additional information could be solicited relating to corporate structure such as information as to the stability and the financial strength of the lender. The level of risk other than misrepresentations typically increases with a decrease in size, newness, and/or availability and source of capital.

The questionnaire, for example, may request information relating to quality control, in particular, the policies and procedures that exist for prefunding and post closing of a loan. The requested information preferably at a minimum matches and is based recognized procedures for the mortgage industry. For example, if there is no quality review, this will negatively impact the rating for the lender, most likely the lender would receive the lowest possible rating because it would be anticipated that there would be a number of repurchase requests and the risk of misrepresentation could be pervasive.

Examples of information and/or procedures that use of would be confirmed include: independent in-file credit report, verbal verification of employment (VOE) utilizing directory assistance or similar, appraisal review (including the process for automatic valuation model (AVM), underwriter review, field review, etc.), an executed IRS Form 4506, review of title commitment vs. sales contract for seller consistency, review of HUD-1 for unusual payoffs from seller's funds, review of exclusionary lists, use of third party fraud services including who and under what circumstances, ability to perform prefunding throughout the organization of the lender, and/or form instructions for settlement agents. Examples of these form instructions (or requirements) for settlement agents include: 1) settlement agent to accept funds only from verified or stated institutions, 2) settlement agent to accept funds only from the borrower, and 3) settlement agent to notify lender in writing prior to close if the settlement agent has knowledge of another transaction involving the property or the borrower or the new mortgage represents an increase of, for example, over 25% (or some other predetermined number) of a previous mortgage made within, for example, the last 180 days (or other predetermined time period). The questionnaire preferably requests whether the procedures require documentation of the review steps and are funding denials formally tracked by correspondent and/or broker and reported to management. These requirements are directed at determining whether fraud, misrepresentation, and/or a property flip may be occurring with the particular sale.

The further away a lender is from its peers, the more impact there will be on a lender's rating with a more rigorous set of quality control leading to a higher rating. Conversely, if the quality control procedures are below a significant portion of its peers' control procedures, then the lender will likely receive a lower rating as the divergence increases and the potential for misrepresentation with a loan handled by the lender increases.

Even with quality control procedures and/or policies in place, there are structural elements that should be in place that provide an indication of the value that is placed on quality control because, for example, it is not desirable for the sales manager (or other production individual) to also be the quality control manager due to the inherent conflict that would result. To this end, the questionnaire preferably will solicit information relating to the structure. Examples of requested information include whether there is an independent reporting line separate from and/or outside the production department, the name and title of the quality control manager, to whom the quality control manager reports including name and title, how experienced is the quality control manager and other quality assurance management in terms of quality control and/or mortgage banking experience, the number of full-time employees who are dedicated to quality control (the focus being on the level of resources dedicated to the quality control function as it relates to the loan volume), do the post closing quality reviews meet selected industry standard requirements (e.g., Fannie Mae, Freddie Mac, HUD, VA), and who performs the post closing reviews. Industry standard requirements include, for example: valid sample selection (10% or statistically random sample), closed loan reviews performed monthly, early payment default (EPD) reviews performed monthly, reports distributed to appropriate management that contain appropriate recommendations and require management response, and trends are tracked and analyzed. This information is directed for use to rate the lender and has a similar impact on the rating as the existence of quality control procedures and/or processes.

The historical information that is requested on the questionnaire preferably provides an overview of the quality of the loans handled by the lender, and thus greatly impacts the rating and in turn the premium that would be charged for insurance coverage. Examples of historical information include the number of repurchase requests, the actual number of repurchases vs. the number of indemnifications in lieu of repurchase, and the losses associated with these requests in some fixed period of time such as two years, and/or the current delinquency/foreclosure rate. The repurchase requests may include those for credit and/or misrepresentation, although repurchase requests based on credit are sometimes misidentified misrepresentation repurchase requests. These repurchase requests numbers preferably are verified in terms of both numbers and that they were correctly classified by talking with the investors as part of the due diligence. Without verification of this information, then this information may not provide an accurate picture of the lender and thus make it difficult to properly rate the lender as compared to their peers. As the numbers that make up this historical information become larger in comparison to the lender's overall loan volume, this is a sign that there may be lax controls, which negatively impacts the lender's rating.

The production information that is requested on the questionnaire preferably provides an overview of production information which provides insight into the potential risk of the lender, which impacts the lender's ratings. Examples of production information that are preferably requested include structure information, controls, and product information.

Examples of the structure information include: the percentage breakouts and prior year's annual dollar volume for correspondent, broker, and retail; in what geographic areas does the lender do business; and in what geographic areas is the lender licensed to do business. More particularly, there are certain geographic areas that are riskier due in part to the level of fraud for those areas. Examples of a geographic area include states, regions of states, counties, and cities. The list is preferably compiled based upon industry knowledge, claim histories, and investor information as to where large numbers of repurchase requests are arising. This list is preferably updated regularly as new information becomes available including both additions and subtractions from the list, which also may cause ratings to be updated in the relevant exemplary embodiments.

Examples of controls include: underwriting authority delegated to correspondents; list of approved appraisers; how are duties segregated relative to broker and correspondent approval (i.e., is the approval function separated from production); and maintenance of a suspended list including procedures for suspension and effective use of same.

Product information can be divided into three groups of information: production information, product type information, and credit information. Each of these three groups can impact the risk connected to a particular lender profile. Examples of production information include product mix including percentage breakdown and projected annual dollar volume between different product types. Examples of product type information include what types of minimal documentation loans (such as NIVs and NINAs) are available to borrowers and what loan programs are available and the breakdown between the loan programs. Examples of credit information include the average loan to value in the lender profile for the lender, the average credit score (e.g., FICO) for the loans, and delinquency rate such as loans that are over 90 days late.

Another topic area that preferably is covered by the questionnaire is information about training opportunities provided to employees of the lender regarding, for example, fraud prevention and detection training as well as training on the proper application of the lender's policies and procedures. Exemplary inquiries are whether the lender devotes training resources to training regarding mortgage fraud and what training has been offered to individuals in a variety of positions that are typically found in a lender. Examples of these positions include quality control, underwriting, processing, closing, and post closing. Preferably, there is a time period included in the training inquiry such that training has occurred, for example, in the last two years. A lender with controls in place, but does not train employees on those controls will have a greater risk for something to go wrong due to the employees not using the controls in general and/or adequately to prevent fraud, misrepresentation and other issues.

Preferably, the questionnaire also inquires about secondary marketing to provide some background information. Examples of requested information include whether there is any securitization of loans, whether the loans are grouped into portfolios, and the company is an approved seller/servicer for, for example, Fannie Mae, Freddie Mac, HUD, and/or VA. If a lender has gained approval from one of these entities, then their rating will be higher in part because the review and continued oversight that occurs after approval has been obtained. Information regarding whether the lender has ever been rejected or suspended by an agency, government-sponsored enterprises (GSE), or other secondary market investor(s) has a negative impact on the lender's rating based on the reason(s) for rejection and/or suspension. Additionally, the investor(s) is contacted to verify this suspension information.

The questionnaire also preferably requests a variety of documents such as an approved broker list; internal suspended/exclusionary lists for brokers, appraisers, etc. as applicable; quality control procedures including prefunding and post closing; a production report for the previous month (or longer period) to allow the creation of a lender profile; broker/correspondent approval procedures; the broker/correspondent agreement; and/or program guide/matrix of the product line offered by the lender. The lender profile information preferably includes the number of loans, breakdown by state, dollar amount, and volume.

Another exemplary embodiment requests information directed at obtaining a summary of the lending operations of the applicant (i.e., the lender). Examples of information that can provide the summary include basic yields on loans, volume of loans, channels used to obtain loans (wholesale versus retail), quality of credit scores of borrowers, average loan size, and geographic breakdown of handled loans. Additional examples of information to be requested from the lender include the structure of the lender including quality control and processing components; quality control policies and procedures; the experience levels of management, processing, underwriting, and quality control individuals; historical information regarding repurchase requests and associated losses, early payment default rate and numbers, and foreclosure rates and numbers; use and maintenance of suspension, exclusion, and approved lists of, for example, brokers, correspondents, and appraisers; training provided to employees including type and level; and secondary marketing. The information in at least one embodiment includes copies of documentation for suspension, exclusion, and approved lists, procedures, policies, prior production report(s), loan program information, and broker/correspondent agreement(s). Another way to look at it is that the information being requested is directed at determining what loan (or more preferably mortgage) profile for the lender (or lender profile) will be insured, completing a satisfactory due diligence, verifying the lender uses best practices, and determining whether the lender has an environment that controls risk. The lender profile of the lender may include loan type, loan size, loan source, and loan geographic information. The experience level of the lender and its personnel in the loan business, and more specifically the experience level(s) with the currently offered products and channels used to obtain loans. For example, if the lender is adding (or recently added) new loan products and/or changing/adding channels to obtain loans, then because of the lower experience level, the lender will be more likely to have processing mistakes and quite possibly be targeted by individuals looking to commit fraud since the lender may be more aggressive and/or less sophisticated in the loan marketplace and thus the risk of a financial loss will be higher.

Another exemplary embodiment adds training and information dissemination. Information that is derived from monitoring repurchase requests and claims made for payment on bad loans is subjected to analysis to determine whether there are any new trends relating to geographic areas and/or product types that are having an increase or decrease in these events. As part of the review of repurchase requests and claims, analyzing the controls that were used to determine if improvement in use of controls or the controls themselves can be improved to minimize the risk in the future. This type of review provides the opportunity to confirm that the lender is using their controls properly as required for obtaining insurance and to troubleshoot what may have gone wrong. One solution to improve compliance with a lender's controls is increasing the training that is provided to employees if there is a large employee turnover. The knowledge gathered from the trends can be decimated to subscribers and/or use to improve the questionnaire.

An alternative embodiment for the above-described exemplary embodiments is to maintain a list that includes entities that based upon their respective histories are found to be ineligible to participate in the mortgage transactions. Preferably, the list is culled from a variety of sources including, for example, the U.S. Department of Housing and Urban Development Limited Denial Participation list (HUD LDP), investor ineligible lists that are received, internally compiled lists, fraud file reviews and claim file reviews performed as part of due diligence, parties indicted on mortgage fraud related counts (e.g., wire fraud, mail fraud, etc.) as reported in a press release(s) and other media outlets, and other national lists available to the lending industry such as disciplinary actions reported by the Appraisal Subcommittee of the Federal Financial Institutions Examination Council (ASC) at www.asc.gov. More preferably, the ineligible list is searchable by state, party name, and the service provided (e.g., broker, appraiser, etc.). More preferably, the list is updated as information becomes available. The ineligible list may be provided to information subscribers. The ineligible list also may be used to perform analysis of lenders to see if there is any overlap between the entities used by the lender and the ineligible list with the resulting rating for the lender being negatively impacted.

A system according to an exemplary embodiment is illustrated in FIG. 3. The system as illustrated includes a database 510 that stores a variety of information related to lenders, including without limitation information about the lender, lender profile for the lender, repurchase information for the lender, and investors. Such information may come from a variety of sources and/or documents including without limitation a questionnaire, interviews with investors that have and/or are doing business with the lender, lender procedures, and/or loan files of the lender.

The information may be input into the system for storage in the database 510 via input devices 520. Input devices 520 in a particular implementation are likely to be personal computers, any type of device that allows the input of data can work. Specifically, the user logs on to the interface engine 530 through an input device 520, whereupon several screens are displayed. Each screen may include one or more fields in which the information can be input, or alternatively, the information can be sent electronically for insertion into the database 510, for example, lender's lender profiles. The screens, for example, may be from software installed on the input device and/or a web interface.

Although the rating entity may enter the information and then simply download the information to the database server for storage in the database 510. The rating entity may in turn use a document preparation company or rely on the lender to input and download some or all of the information directly for storage in the database 510. Such input devices 520 may then also be used to input any information to be stored in the database 510. The information may be input to the system by a lender in the same manner as described above with respect to the rating entity. One or more of the input devices 520 may be connected to a printer for printing reports generated by the system.

The information from the questionnaire and gathered during the due diligence review is preferably stored in a relational database 510. The database 510 preferably includes a data table with all of the lender contact information and identification. The lender identification is used to link each lender to entries in the questionnaire data table that includes the answers to the questionnaire. An alternative embodiment includes a data table containing links to electronic versions of documents submitted by lenders, otherwise this material may be kept in paper form. In addition, the lender identification is preferably used to link the lender to submitted loan information, which preferably is divided into individual loans. As one of ordinary skill in the art will appreciate, relational databases may be setup with a variety of software packages.

The system preferably includes filters 540 preset to automatically scan submitted loan information based on a variety of production mix and loan characteristics including but not limited to loan size, applicant's credit score, geographic region, number of liens on the property, loan to value ratios, and origination sources. The filters 540 preferably are set for either a threshold and/or divergence from the average loan in the pool. To best accomplish this, the loan information preferably is submitted electronically by the lender.

The system preferably includes a website interface 530 that allows a lender to electronically submit their questionnaire initially. The interface 530 preferably includes a renewal option that will show the previously entered information for the lender to review and update as needed. The system preferably tracks the changes to assist in adjusting the rating for the lender based on a change in circumstances.

The present invention described above with reference to the accompanying drawings, in which preferred and exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The accompanying drawings show exemplary embodiments of the invention.

As will be appreciated by one of ordinary skill in the art, the present invention may be embodied as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, or other storage devices.

Computer program code for carrying out operations of the present invention may be written in a variety of languages. However, consistent with the invention, the computer program code for carrying out operations of the present invention may also be written in other conventional procedural programming languages.

The program code may execute entirely on a mobile computing device, as a stand-alone software package, or it may execute partly on a system user's computing device and partly on a remote computer. In the latter scenario, the remote computer may be connected directly to the system user's computing device via a LAN or a WAN (Intranet), or the connection may be made indirectly through an external computer (for example, through the Internet, a secure network, a sneaker net, or some combination of these). System users include, for example, individuals participating in the performance of the method and third parties like information customers such as lenders, investors, and insurance carriers and/or their agents that are using the system.

The present invention described above with reference to flowchart illustrations and/or block diagrams of methods, apparatus (systems) and computer programs in accordance with several embodiments of the invention. It will be understood that each block of the flowchart illustrations and block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means or program code that implements the function specified in the flowchart block or blocks.

The computer program instructions may also be loaded, e.g., transmitted via a carrier wave, to a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Various templates and the database(s) according to the present invention may be stored locally on a provider's stand-alone computer terminal (or mobile computing device), such as a desktop computer, laptop computer, palmtop computer, or personal digital assistant (PDA) or the like. Exemplary stand-alone computers may include, but are not limited to, Apple®, Sun Microsystems®, IBM®, or Windows®-compatible personal computers. Accordingly, the present invention may be carried out via a single computer system, such as a desktop computer or laptop computer.

According to at least one exemplary embodiment, the database may be centrally stored within one or more computers accessible to multiple system users. Accordingly, system users may access the database through a private or public computer network in a conventional manner via wired or wireless communications. By maintaining the database in a central location, updates can be easily made to the database by a system administrator without having to access all of the machines in the network.

As is known to those with skill in this art, network environments may include public networks, such as the Internet, and private networks often referred to as "Intranets" and "Extranets." The term "Internet" shall incorporate the terms "Intranet" and "Extranet" and any references to accessing the Internet shall be understood to mean accessing an Intranet and/or an Extranet, as well unless otherwise noted. The term "computer network" shall incorporate publicly accessible computer networks and private computer networks.

The exemplary and alternative embodiments described above may be combined in a variety of ways with each other. Furthermore, the dimensions, shapes, sizes, and number of the various pieces illustrated in the Figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

We claim:

1. A method for performing due diligence of a lender by providing a rating assessing risks that loan applications and loans handled by the lender will be based on fraud or result in default, the method using at least one computer and a database, the method comprising:
   receiving a request for a lender questionnaire from a requestor,
   forwarding the lender questionnaire to a lender to be rated regarding loans handled by the lender and whose information will be submitted in response to the lender questionnaire requested by the requestor,
   receiving lender information in response to the lender questionnaire from the lender including a business model used by the lender, loan sources used by the lender to obtain loan applications and loans, and product types handled by the lender including the number and total dollar value of loans by product type, the received lender information is entered into the database,
   contacting investors regarding the lender from whom the investors have purchased at least one loan from previously, the lender contacted about being the lender that responded to the lender questionnaire, contacting investors includes populating the database with information received from the contacted investors,
   reviewing qualitative controls established by the lender for processing loan applications and/or for conducting a post-closing review of loans recently closed, the review of the qualitative controls includes whether the qualitative controls are being used correctly during underwriting and funding of loans, where the review uses the computer,
   analyzing the received lender information provided in response to the lender questionnaire using the computer and database entries associated with the lender being rated, and
   rating the lender based on information received from the investors, the review of the lender's qualitative controls, and the analysis of the lender information, where rating uses the computer.

2. The method according to claim 1, further comprising:
   renewing a lender's rating using the computer including
      requesting a lender update and verification of previously submitted lender information received in response to the lender questionnaire,
      comparing the updated information received in response to the update and verification request to the previously received lender information stored in the database,
      analyzing the impact of differences found during the comparison, and
      rerating the lender based on the analysis of the impact of differences found during the comparison.

3. The method according to claim 1, wherein the lender information includes identification of investors who have purchased loans from the lender, and
   the identification of investors is used to select investors to contact about the lender.

4. The method according to claim 1, wherein the lender information includes policies and procedures used by the lender to implement qualitative controls for underwriting and funding loans, corporate structure for the lender, and historical information regarding loans handled by the lender.

5. The method according to claim 1, wherein the lender information includes policies and procedures regarding qualitative controls used for prefunding and post closing of loans by the lender.

6. The method according to claim 4, wherein the lender information regarding policies and procedures includes form instructions used by the lender for how settlement agents are to conduct a loan closing and sent by the lender for each closing to a settlement agent who handles the loan closing.

7. The method according to claim 4, wherein the historical information includes the number of repurchase requests and the current delinquency/foreclosure rate for loans handled by the lender being rated.

8. The method according to claim 7, further comprising verifying the number of repurchase requests for both number of requests and reasons for repurchase requests.

9. The method according to claim 1, wherein the lender information includes a summary of the lending operations of the lender.

10. The method according to claim 9, wherein the summary includes loans sizes, loan sources, and loan geographic information.

11. The method according to claim 1, further comprising creating a lender profile based on the lender information.

12. The method according to claim 1, wherein lender information includes information sufficient for allowing an assessment of a risk that a loan sold by the lender will lead to a repurchase request.

13. The method according to claim 1, wherein the lender information further includes an organizational structure for the lender including any corporate hierarchy, experience and training levels of key personnel of the lender including any degrees held by the key personnel, a lender history including length of existence and growth, and capitalization levels.

14. The method according to claim 1, wherein the rating of the lender is impacted in part by differences between the lender's qualitative controls and accepted industry standards, ratios of loan types offered by the lender, and loan sources other than the lender itself utilized by the lender to acquire loans.

15. The method according to claim 1, further comprising distributing ratings for a plurality of lenders to enable comparisons to be made between lenders and a level of risk associated with each lender.

16. A method for updating a lender rating representing a risk associated with fraud or default arising in loan applications and loans handled by a lender, the method using at least one computer, the method comprising:

receiving updated loan information electronically from a lender, where the updated loan information includes at least the number and dollar volume of loans overall, by product type, and by geographic area handled by the lender and qualitative controls used by the lender in underwriting through post-closing on loan applications and loans, comparing with the computer the received updated loan information to a lender profile based on previous information received from the lender during a prior rating analysis, the lender profile includes at least the number and dollar volume of loans overall, by product type, and by geographic area handled by the lender and qualitative controls used by the lender in underwriting through post-closing on loan applications and loans, and when a variance detected by the computer between the received updated loan information and the lender profile is greater than a predetermined threshold, then performing the following updating the lender profile in view of the received updated loan information, and adjusting the lender rating based on the updated lender profile.

17. The method according to claim 16, wherein the updated loan information represents a mixture of loans handled by the lender since the lender rating was last set.

18. The method according to claim 16, wherein receiving updated loan information occurs at predetermined intervals.

19. A method for updating a rating for a lender based on analysis of an insurance claim for coverage made by the lender, the method using at least one computer, the method comprising:

analyzing the insurance claim using a computer to determine which if any of a lender's qualitative controls were utilized by the lender during underwriting of a loan application and/or loan that resulted in the insurance claim;

assisting the lender to further refine qualitative controls to avoid and/or prevent a similar repurchase request;

analyzing with computer the insurance claim and similar insurance claims submitted previously for mortgage fraud trends, using the computer;

when a trend exists based on the computer analysis, performing at least one of the following provide notification to insureds of an insurer of the mortgage fraud trend, and offer suggestions on how to improve qualitative controls and/or loan practices used by insureds of the insurer to counteract and/or take advantage of the mortgage fraud trend; and adjusting the rating using the computer based on the insurance claim and qualitative control analysis if necessary to provide an assessment of a risk that a loan sold by the lender will lead to a repurchase request.

20. The method according to claim 19, wherein the insurance claim is made by the lender in response to a repurchase request.

21. The method according to claim 19, further comprising:

when the trend exists as detected by the computer, determining which other lenders would be impacted by the mortgage fraud trend using the computer, and adjusting the rating of the other lenders determined to be impacted by the mortgage fraud trend.

22. A method for updating a lender rating using a computer comprising:

receiving loan product information electronically from a lender, where the loan product information covers all loans handled by the lender since a prior rating analysis, comparing with a computer the received loan product information to a lender profile based on information received from the lender during the prior rating analysis, and when a variance detected by the computer between the received loan product information and the lender profile is greater than a predetermined threshold, then performing the following updating the lender profile in view of the received loan product information, and adjusting the lender rating based on the updated lender profile; and the rating represents an assessment of risks that a loan application or a loan handled by the lender will be based on a fraud or result in a default.

\* \* \* \* \*